United States Patent
Tamura

(10) Patent No.: US 11,753,859 B2
(45) Date of Patent: Sep. 12, 2023

(54) VEHICLE OPERATION DETECTION DEVICE AND VEHICLE OPERATION DETECTION METHOD

(71) Applicant: AISIN CORPORATION, Aichi (JP)

(72) Inventor: Takuya Tamura, Kariya (JP)

(73) Assignee: AISIN CORPORATION, Kariya (JP)

( * ) Notice: Subject to any disclaimer, the term of this patent is extended or adjusted under 35 U.S.C. 154(b) by 20 days.

(21) Appl. No.: 17/188,042

(22) Filed: Mar. 1, 2021

(65) Prior Publication Data

US 2021/0301580 A1 Sep. 30, 2021

(30) Foreign Application Priority Data

Mar. 25, 2020 (JP) .................................. 2020-054417
Jan. 20, 2021 (JP) .................................. 2021-006837

(51) Int. Cl.
*E05F 15/00* (2015.01)
*E05F 15/73* (2015.01)
*B60J 5/06* (2006.01)

(52) U.S. Cl.
CPC .............. *E05F 15/73* (2015.01); *B60J 5/062* (2013.01); *E05F 2015/767* (2015.01); *E05Y 2400/40* (2013.01); *E05Y 2400/85* (2013.01); *E05Y 2900/531* (2013.01)

(58) Field of Classification Search
CPC ............. E05F 15/73; E05F 2015/767; E05Y 2400/40; E05Y 2900/531; E05Y 2400/85; E05Y 2400/858; B60J 5/062
USPC ........................................................... 49/31
See application file for complete search history.

(56) References Cited

U.S. PATENT DOCUMENTS

| 8,717,429 | B2 * | 5/2014 | Giraud ............... G07C 9/00309 348/77 |
| 9,689,982 | B2 * | 6/2017 | Herthan ............... G01S 13/0209 |
| 10,053,903 | B2 * | 8/2018 | Ette ..................... B60R 25/2054 |
| 10,174,542 | B1 * | 1/2019 | Ramakrishnan ...... E05F 15/611 |
| 2006/0025897 | A1 * | 2/2006 | Shostak ............. G06K 19/0717 701/1 |
| 2011/0248820 | A1 | 10/2011 | Gehin |
| 2016/0028141 | A1 | 1/2016 | Schanz et al. |

(Continued)

FOREIGN PATENT DOCUMENTS

| JP | 5832895 B2 | 12/2015 |
| JP | 2016-196798 A | 11/2016 |

*Primary Examiner* — Chi Q Nguyen
(74) *Attorney, Agent, or Firm* — Oblon, McClelland, Maier & Neustadt, L.L.P.

(57) ABSTRACT

A vehicle operation detection device is applicable to a vehicle including a vehicle body in which an opening portion is provided, an opening and closing body which opens and closes the opening portion, an actuator which causes the opening and closing body to perform opening and closing operations, and a camera which captures an image around the opening portion, and is configured to detect a gesture of a user for starting at least one of the opening operation and the closing operation. The device includes: a direction specifying unit that specifies a direction of the user with respect to the vehicle based on the image captured by the camera; and a gesture detection unit that detects the gesture including a motion in a direction associated with the direction of the user, based on the image captured by the camera, when the direction specifying unit specifies the direction of the user.

8 Claims, 9 Drawing Sheets

(56) References Cited

U.S. PATENT DOCUMENTS

| | | | | |
|---|---|---|---|---|
| 2017/0032599 A1* | 2/2017 | Elie | .......................... | G07C 9/32 |
| 2017/0247926 A1* | 8/2017 | Elie | ......................... | E05F 15/40 |
| 2017/0306684 A1* | 10/2017 | Baruco | ................. | E05F 15/622 |
| 2018/0236972 A1* | 8/2018 | Linden | .................... | B60R 25/01 |
| 2021/0087868 A1* | 3/2021 | Washeleski | ............. | E05F 15/44 |
| 2021/0142055 A1* | 5/2021 | Broggi | ..................... | G08G 1/01 |
| 2021/0263591 A1* | 8/2021 | Bensalem | ............. | E05F 15/665 |
| 2021/0293073 A1* | 9/2021 | Morosawa | .............. | E05F 15/73 |

* cited by examiner

VEHICLE OPERATION DETECTION DEVICE AND VEHICLE OPERATION DETECTION METHOD

CROSS REFERENCE TO RELATED APPLICATIONS

This application is based on and claims priority under 35 U.S.C. § 119 to Japanese Patent Applications 2020-54417 and 2021-006837, filed on Mar. 25, 2020 and Jan. 20, 2021, respectively, the entire content of which is incorporated herein by reference.

TECHNICAL FIELD

This disclosure relates to a vehicle operation detection device and a vehicle operation detection method.

BACKGROUND DISCUSSION

JP 2016-196798A discloses a vehicle including a vehicle body in which an opening portion is provided, a vehicle gate that opens and closes the opening portion, a gate actuator that drives the vehicle gate, a camera that captures images around the vehicle, and a vehicle operation detection device that controls the gate actuator based on the images captured by the camera. When it is determined that a user performs a gesture determined in advance, based on the images captured by the camera, the vehicle operation detection device instructs the gate actuator to cause the vehicle gate to perform an opening operation.

The vehicle operation detection device described above has rooms for improvement in accurately detecting the gesture of the user. A need thus exists for a vehicle operation detection device and a vehicle operation detection method which are not susceptible to the drawback mentioned above.

SUMMARY

Hereinafter, means for meeting the above need and the effects thereof will be described.

A vehicle operation detection device according to an aspect of this disclosure is applied to a vehicle including a vehicle body in which an opening portion is provided, an opening and closing body which opens and closes the opening portion, an actuator which causes the opening and closing body to perform opening and closing operations, and a camera which captures an image around the opening portion, configured to detect a gesture of a user for starting at least one of the opening operation and the closing operation of the opening and closing body. The device includes: a direction specifying unit that specifies a direction of the user with respect to the vehicle based on the image captured by the camera; and a gesture detection unit that detects the gesture including a motion in a direction associated with the direction of the user, based on the image captured by the camera, when the direction specifying unit specifies the direction of the user.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a first embodiment of a vehicle operation detection device (hereinafter, also referred to as an "operation detection device") and a vehicle operation detection method (hereinafter, also referred to as an "operation detection method") will be described with reference to the drawings. In the following description, the width direction of a vehicle is also referred to as a "width direction", the forward and rearward direction of the vehicle is also referred to as a "forward and rearward direction", and the upward and downward direction of the vehicle is also referred to as an "upward and downward direction". In the figures, an axis extending in the width direction is an X-axis, an axis extending in the forward and rearward direction is a Y-axis, and an axis extending in the upward and downward direction is a Z-axis.

Figure 1:
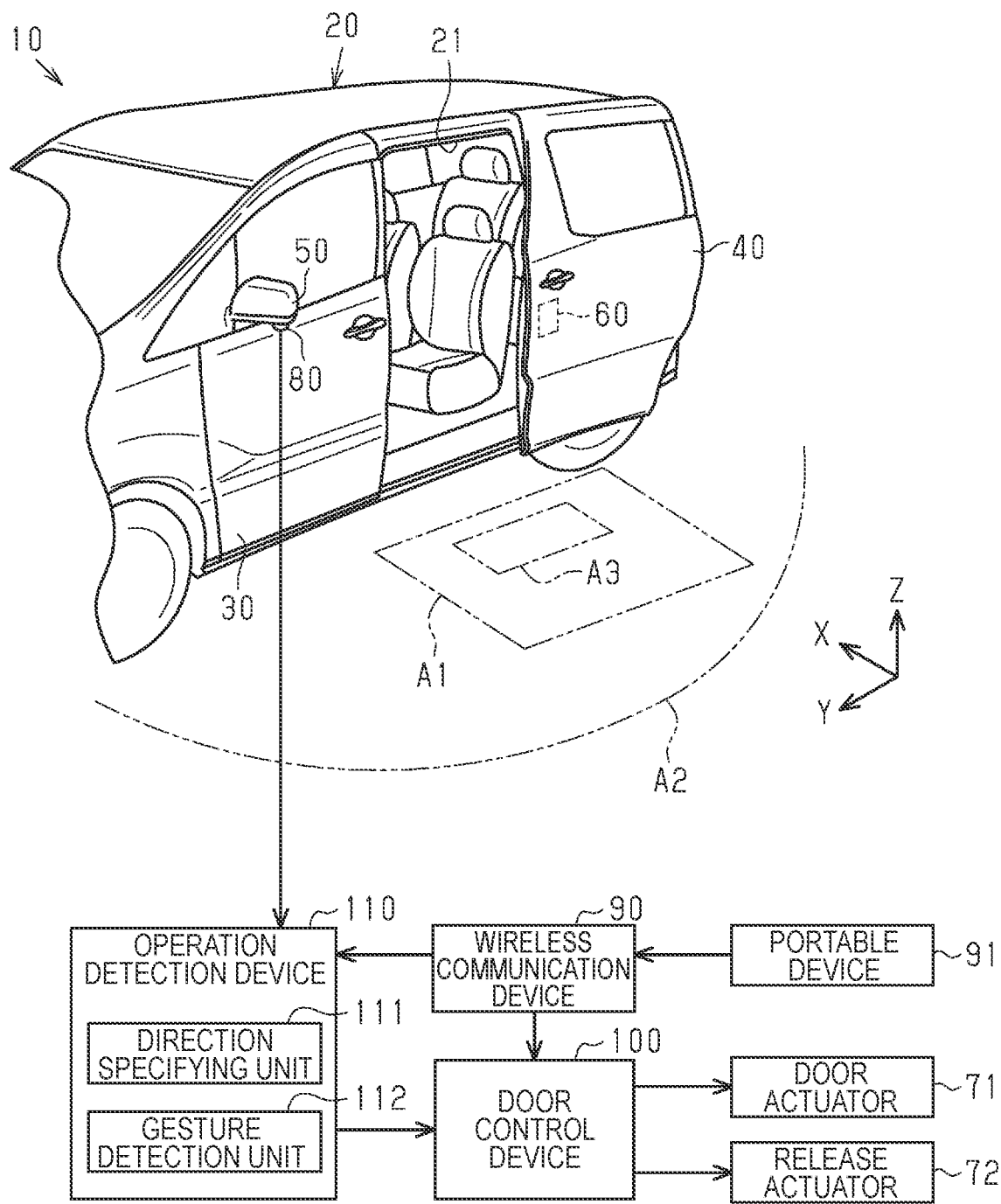
FIG. 1 is a schematic view illustrating a schematic configuration of a vehicle including a vehicle operation detection device according to a first embodiment.

As illustrated in FIG. 1, a vehicle 10 includes a vehicle body 20, a front door 30 that is swingably supported by the vehicle body 20, a slide door 40 that is slidably supported by the vehicle body 20, a side mirror 50 that is disposed in the front door 30, and a latch mechanism 60 that restrains the slide door 40 to the vehicle body 20. In addition, the vehicle 10 includes a door actuator 71 that drives the slide door 40, a release actuator 72 that drives the latch mechanism 60, and a camera 80 that is installed in the side mirror 50. Further, the vehicle 10 includes a wireless communication device 90 that performs wireless communication with a portable device 91, a door control device 100 that controls the door actuator 71 and the release actuator 72, and an operation detection device 110 that detects a gesture of a user.

The vehicle body 20 includes a door opening portion that is opened and closed by the front door 30, and a door opening portion 21 that is opened and closed by the slide door 40. In FIG. 1, only the door opening portion 21 which is the latter is illustrated. The door opening portion 21 is a portion through which the user passes when going back and forth inside and outside the vehicle 10. In the first embodiment, the door opening portion 21 corresponds to one example of an "opening portion".

The front door 30 is located in front of the slide door 40. The front door 30 swings around an axis, which extends in the upward and downward direction, with respect to the vehicle body 20 to be displaced between a fully closed position and a fully open position. The slide door 40 slides with respect to the vehicle body 20 in the forward and rearward direction to be displaced between a fully closed position and a fully open position. The opening direction of the slide door 40 is rearward, and the closing direction of the slide door 40 is forward. The door actuator 71 causes the slide door 40 to perform the opening and closing operations between the fully closed position and the fully open position. In the first embodiment, the slide door 40 and the door actuator 71 correspond to an "opening and closing body" and an "actuator", respectively.

The latch mechanism 60 switches between a latch state where the slide door 40 disposed in the fully closed position is restrained to the vehicle body 20 and an unlatch state where the restraint of the slide door 40 to the vehicle body 20 in the fully closed position is released. The release actuator 72 causes the latch mechanism 60 to transition from the latch state to the unlatch state. In the following description, the transition of the latch mechanism 60 from the latch state to the unlatch state is also referred to as an "unlatch operation".

The camera 80 is disposed in the side mirror 50 so as to face downward and rearward. As illustrated in FIG. 1, an imaging area A1 of the camera 80 includes an area around the door opening portion 21. It is preferable that the angle of view of the camera 80 is a wide angle, and a fisheye lens may be used as the lens of the camera 80. The camera 80 outputs the captured image to the operation detection device 110 for each frame.

The portable device 91 includes a switch that is operated to cause the slide door 40 to perform the opening and closing operations or to stop. The portable device 91 may be a so-called electronic key, a smartphone, or other communication terminals. The wireless communication device 90 performs wireless communication with the portable device 91 located around the vehicle 10, to determine whether or not the portable device 91 is the portable device 91 associated with the vehicle 10. In other words, the wireless communication device 90 determines whether or not a user who carries the portable device 91 is present in a communication area A2 set around the vehicle 10.

When the switch for operation of the slide door 40 in the portable device 91 is operated, the wireless communication device 90 outputs an opening operation command signal, a closing operation command signal, and a stop command signal to the door control device 100 according to the switch operated. The opening operation command signal is a command signal for causing the slide door 40 to perform the opening operation, and the closing operation command signal is a command signal for causing the slide door 40 to perform the closing operation. The stop command signal is a command signal for causing the slide door 40 during opening and closing operations to stop. In addition, when the user who carries the portable device 91 is present in the communication area A2, the wireless communication device 90 outputs a signal to that effect to the operation detection device 110.

The door control device 100 controls the door actuator 71 and the release actuator 72 based on the content of the command signal input. Specifically, when the opening operation command signal is input, the door control device 100 instructs the release actuator 72 to cause the latch mechanism 60 to perform the unlatch operation, and then instructs the door actuator 71 to cause the slide door 40 to perform the opening operation. When the closing operation command signal is input, the door control device 100 instructs the door actuator 71 to cause the slide door 40 to perform the closing operation. When the stop command signal is input, the door control device 100 instructs the door actuator 71 to cause the slide door 40 during operation to stop.

Next, the operation detection device 110 will be described.

When the operation detection device 110 detects a gesture using a foot F of the user, the operation detection device 110 outputs a command signal, which corresponds to the gesture, to the door control device 100. Namely, the operation detection device 110 is a device that detects an operation request of the user for the slide door 40, similar to the switch provided in the portable device 91. In the following description, a gesture of the user for causing the slide door 40 to perform the opening operation will be described.

As illustrated in FIG. 1, the operation detection device 110 includes a direction specifying unit 111 that specifies the direction of the user with respect to the vehicle 10 based on the image captured by the camera 80, and a gesture detection unit 112 that detects a gesture of the user based on the image captured by the camera 80.

Figure 2:
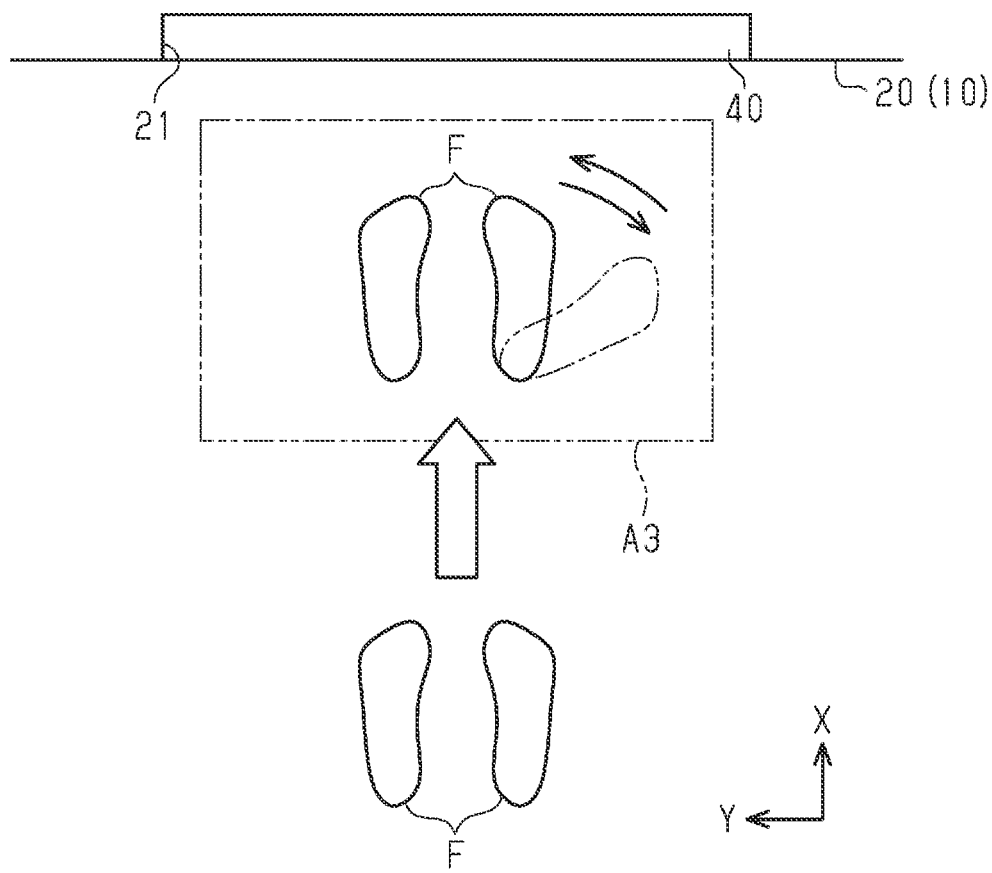
FIG. 2 is a schematic view illustrating one example of the direction of a user and a gesture of the user in the first embodiment.
Figure 4:
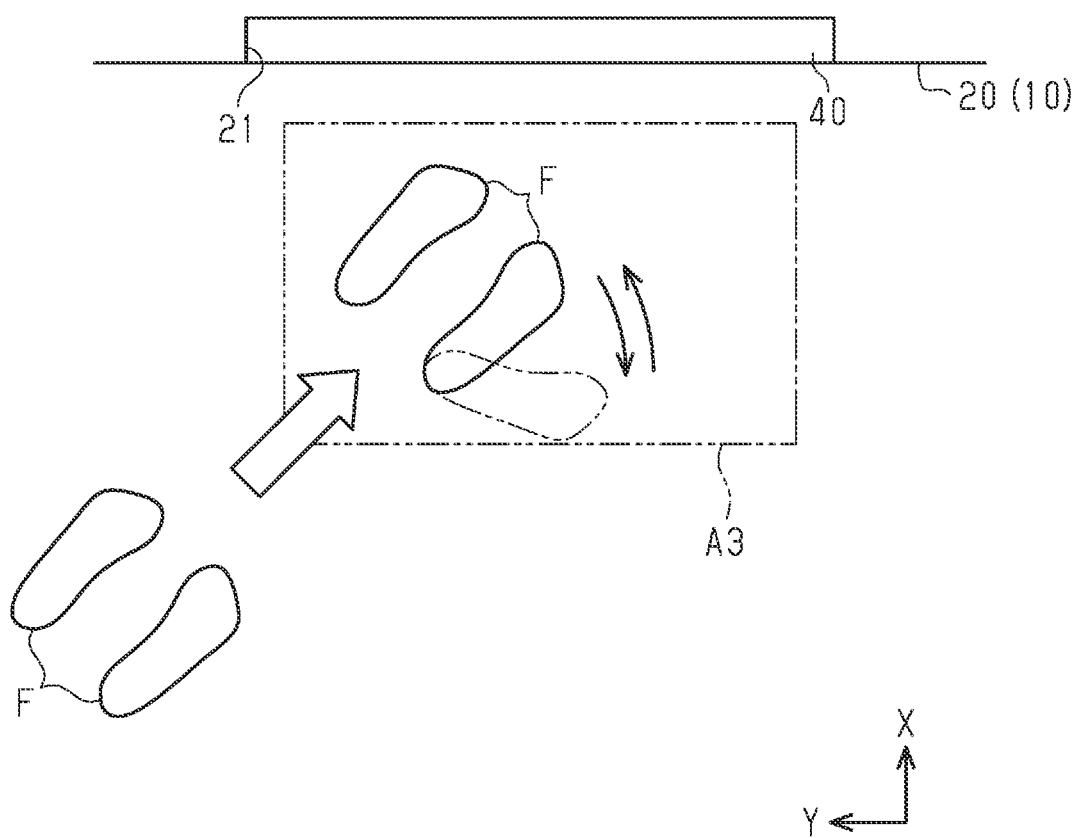
FIG. 4 is a schematic view illustrating one example of the direction of the user and a gesture of the user in the first embodiment.

As illustrated in FIGS. 1, 2 and 4, the direction specifying unit 111 specifies the direction of the user with respect to the vehicle 10 in a recognition area A3 set in the image captured by the camera 80. As illustrated in FIG. 2, when the user approaches the vehicle 10, the direction of the user is a direction along the width direction as indicated by a white arrow. Meanwhile, as illustrated in FIG. 4, when the user approaches the vehicle 10, the moving direction of the user is a direction intersecting both directions of the width direction and the forward and rearward direction as indicated by a white arrow. Incidentally, the direction specifying unit 111 may detect a moving object between images captured at predetermined intervals by the camera 80, and specify the moving direction of the moving object as the direction of the user. For example, "Open CV" which is an open source library of Intel Corporation can be used for detecting the moving object.

In the first embodiment, the direction of the user is the direction of the foot F of the user, and is the moving direction of the user who performs a gesture. For this reason, it is preferable that the direction specifying unit 111 does not specify the moving directions of other users who do not perform a gesture and the moving directions of other moving objects, as the direction of the user.

For example, since the user who performs a gesture approaches the vehicle 10, and then perform a gesture, a moving object moving in a direction away from the vehicle 10 is highly likely to not be a user who performs a gesture later. Therefore, when a moving object moving in a direction away from the vehicle 10 is present in the recognition area A3, the direction specifying unit 111 does not specify the moving direction of the moving object as the direction of the user.

In addition, when the user who performs a gesture enters the recognition area A3, the user moves by walking or moves by running. Namely, before the user performs a gesture, a pair of feet F of the user who performs a gesture enter the recognition area A3. Therefore, when a pair of moving objects moving with respect to the vehicle 10 are present in the recognition area A3, the direction specifying unit 111 specifies the moving direction of the pair of moving objects as the direction of the pair of feet F of the user. In other words, when there is a single moving object moving with respect to the vehicle 10, the direction specifying unit 111 does not specify the moving direction of the single moving object as the direction of the user. The direction specifying unit 111 may specify the moving direction of a pair of moving objects as the direction of the user only when the pair of moving objects move alternately in consideration of a walking mode of the user.

As described above, when a moving object is present between the images captured at the predetermined intervals by the camera 80, the direction specifying unit 111 does not unconditionally specify the moving direction of the moving object as the direction of the user. Namely, when the direction specifying unit 111 can determine that the moving object is highly likely to be the user, based on a movement mode of the moving object between the images or the like, the direction specifying unit 111 specifies the moving direction of the moving object as the direction of the user.

When the gesture detection unit 112 can detect a gesture including a motion in a direction associated with the direction of the user specified by the direction specifying unit 111, the gesture detection unit 112 outputs various command signals to the door control device 100. As indicated by solid arrows in FIGS. 2 and 4, in the first embodiment, a gesture for causing the slide door 40 to perform the opening operation is a motion of swinging a right tiptoe such that the right tiptoe draws an arc, in a state where the tiptoes of both feet of the user face in the moving direction of the user. In other words, the gesture is a motion of opening and closing the right tiptoe without changing the position of a right heel with respect to a left foot, in a state where the tiptoes of both feet of the user face in the moving direction of the user.

Namely, when the gestures illustrated in FIGS. 2 and 4 are compared to each other, it can be said that the directions of motion of the gestures of the user with respect to the direction of the user are the same, but the directions of motion of the gestures of the user with respect to the direction of the vehicle 10 are different. The details will be described below.

Figure 3:
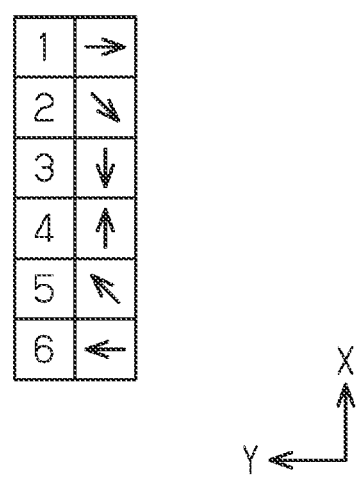
FIG. 3 is a table showing the order of switching of the directions of motion of the gesture of the user in FIG. 2.

In a case where the direction of the user is the direction illustrated in FIG. 2, when the directions of motion of a moving object assumed to be the right tiptoe of the user are switched in order of a rightward direction firstly, a right downward direction secondly, a downward direction thirdly, an upward direction fourthly, a left upward direction fifthly, and a leftward direction sixthly as illustrated in FIG. 3, the gesture detection unit 112 determines that the user has performed a gesture. In this case, the first direction of motion is a direction inclined "+90°" with respect to the direction of the user, the second direction of motion is a direction inclined "135°" with respect to the direction of the user, and the third direction of motion is a direction inclined "+180°" with respect to the direction of the user. In addition, the fourth direction of motion is the same direction as the direction of the user, the fifth direction of motion is a direction inclined "−45°" with respect to the direction of the user, and the sixth direction of motion is a direction inclined "−90°" with respect to the direction of the user. Incidentally, in FIG. 3, the rightward direction and the leftward direction are the forward and rearward direction of the vehicle 10, and the upward direction and the downward direction are the width direction of the vehicle 10. In addition, regarding the inclination, the clockwise direction is a positive direction and the counterclockwise direction is a negative direction.

Figure 5:
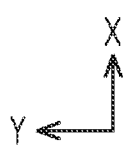
FIG. 5 is a table showing the order of switching of the directions of motion of the gesture of the user in FIG. 4.

In addition, in a case where the direction of the user is the direction illustrated in FIG. 4, when the directions of motion of a moving object assumed to be the right tiptoe of the user are switched in order of the right downward direction firstly, the downward direction secondly, a left downward direction thirdly, a right upward direction fourthly, the upward direction fifthly, and the left upward direction sixthly as illustrated in FIG. 5, the gesture detection unit 112 detects that the user has performed a gesture. In this case, the first direction of motion is a direction inclined "+90°" with respect to the direction of the user, the second direction of motion is a direction inclined "+135°" with respect to the direction of the user, and the third direction of motion is a direction inclined "+180°" with respect to the direction of the user. In addition, the fourth direction of motion is the same direction as the direction of the user, the fifth direction of motion is a direction inclined "−45°" with respect to the direction of the user, and the sixth direction of motion is a direction inclined "−90°" with respect to the direction of the user. Incidentally, in FIG. 5, similar to FIG. 3, the rightward direction and the leftward direction are the forward and rearward direction of the vehicle 10, and the upward direction and the downward direction are the width direction of the vehicle 10. In addition, regarding the inclination, the clockwise direction is a positive direction and the counterclockwise direction is a negative direction.

Namely, in terms of the relationship with the direction of the user, the directions of motion of the right tiptoe of the user are the same in the case illustrated in FIG. 2, the case illustrated in FIG. 4, and other cases. For this reason, after the direction specifying unit 111 specifies the direction of the user with respect to the vehicle 10, the gesture detection unit 112 can set the directions of motion of a gesture in advance in association with the specified direction of the user. Then, the gesture detection unit 112 can determine whether or not the directions of motion of the moving object between the images captured at the predetermined intervals by the camera 80 are switched in order of the directions of motion set in advance, to detect the gesture of the user.

Next, the flow of a process that is executed by the operation detection device 110 in order to detect a gesture indicating an opening operation request of the user will be described with reference to the flowchart illustrated in FIG. 6. Namely, an "operation detection method" will be described. This process is a process that is repeatedly executed in a predetermined control cycle when the vehicle 10 is stopped.

Figure 6:
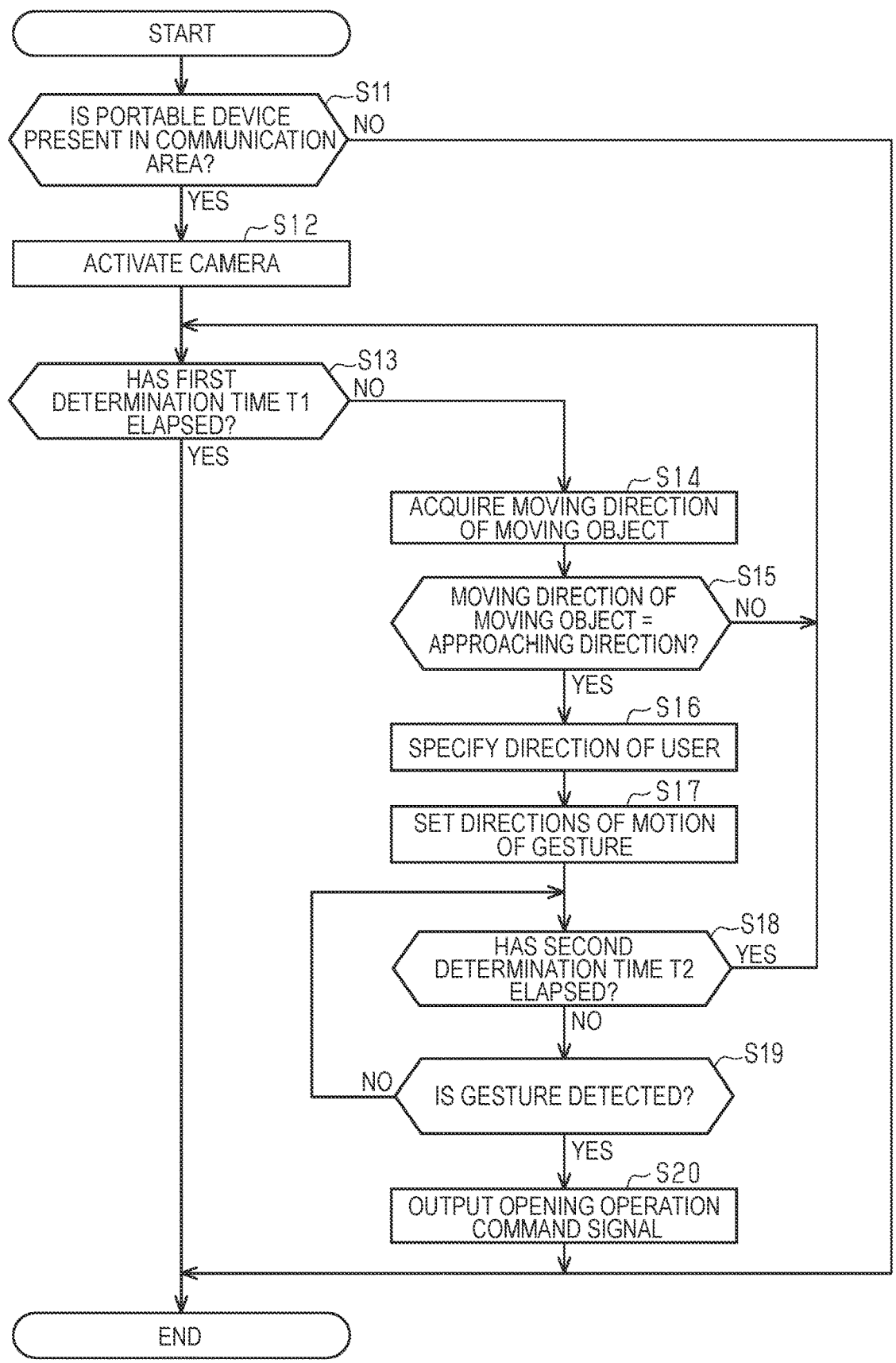
FIG. 6 is a flowchart describing the flow of a process that is executed by the vehicle operation detection device in order to detect a gesture of the user in the first embodiment.

As illustrated in FIG. 6, the operation detection device 110 determines whether or not the portable device 91 is present in the communication area A2, based on a signal input from the wireless communication device 90 (S11). When the portable device 91 is not present in the communication area A2 (S11: NO), in other words, when the user is not present in the communication area A2, the operation detection device 110 ends this process for the moment.

On the other hand, when the portable device 91 is present in the communication area A2 (S11: YES), in other words, when the user is present in the communication area A2, the operation detection device 110 activates the camera 80 to capture images of the user (S12). When the camera 80 is activated, the operation detection device 110 can sequentially acquire the images captured by the camera 80.

Subsequently, the operation detection device 110 determines whether or not the elapsed time from the activation of the camera 80 is a first determination time T1 or more (S13). The first determination time T1 is a time for waiting for the user to execute a gesture. The length of the first determination time T1 may be appropriately set. When the elapsed time from the activation of the camera 80 is the first determination time T1 or more (S13: YES), the operation detection device 110 ends this process for the moment. On the other hand, when the elapsed time from the activation of the camera 80 is less than the first determination time T1 (S13: NO), the operation detection device 110 acquires the moving direction of a pair of moving objects with respect to the vehicle 10 in the recognition area A3 based on the images captured by the camera 80 (S14). In step S14, when the moving direction of the moving objects cannot be acquired since there are no moving objects moving with respect to the vehicle 10, and when only the moving direction of a single moving object moving with respect to the vehicle 10 can be acquired, the operation detection device 110 causes the process to proceed to step S13 which is a previous step.

Subsequently, the operation detection device 110 determines whether or not the moving direction of the pair of moving objects entering the recognition area A3 is a direction approaching the vehicle 10 (S15). When the moving direction of the pair of moving objects is not the direction approaching the vehicle 10 (S15: NO), in other words, when the pair of moving objects are assumed to not be the pair of feet F of the user who performs a gesture later, the operation detection device 110 causes the process to proceed to step S13 which is a previous step. On the other hand, when the moving direction of the pair of moving objects is the direction approaching the vehicle 10 (S15: YES), in other words, when the pair of moving objects are assumed to be the pair of feet F of the user who performs a gesture later, the operation detection device 110 specifies the moving direction of the pair of moving objects as the direction of the user (S16).

Then, the operation detection device 110 sets the directions of motion of the gesture in association with the specified direction of the user (S17). When the setting of the directions of motion of the gesture is completed, the operation detection device 110 determines whether or not the elapsed time from the execution of the process of step S17 is a second determination time T2 or more (S18). The second determination time T2 is the period of validity of the setting of the directions of motion of the gesture in step S17, and is a shorter period than the first determination time T1.

When the elapsed time from the execution of the process of step S17 is the second determination time T2 or more (S18: YES), the operation detection device 110 causes the process to proceed to step S13 which is a previous step. On the other hand, when the elapsed time from the execution of the process of step S17 is less than the second determination time T2 (S18: NO), the operation detection device 110 determines whether or not the gesture of the user has been detected, based on the images captured by the camera 80 (S19). Specifically, it is determined whether or not the directions of motion of the moving object assumed to be the right tiptoe of the user are changed in order of the directions of motion set in step S17. When the gesture cannot be detected (S19: NO), the operation detection device 110 causes the process to proceed to step S18, and when the gesture can be detected (S19: YES), the operation detection device 110 outputs an opening operation command signal to the door control device 100 (S20). Thereafter, the operation detection device 110 ends this process.

In the flowchart described above, steps S14 to S16 correspond to "direction specifying steps", and steps S17 to S19 correspond to "gesture detection steps".

The operation of the first embodiment will be described.

For example, a case where the user holds luggage with both hands intends to get on the vehicle 10 is assumed. In this case, the user moves to the front of the slide door 40 of the vehicle 10, and then swings the right tiptoe with respect to the left foot. Then, the slide door 40 performs the opening operation, and the user can place the luggage, which is held with both hands, in a rear seat. Here, an approaching direction of the user with respect to the vehicle 10 may be the forward and rearward direction of the vehicle 10, may be the width direction of the vehicle 10, or may be a direction intersecting both directions of the forward and rearward direction and the width direction of the vehicle 10. Namely, regardless of the approaching direction with respect to the vehicle 10, the user can cause the slide door 40 to perform the opening operation by performing a certain gesture. In other words, the user does not need to align the opening direction of the right tiptoe with the opening direction of the slide door 40.

The effects of the first embodiment will be described.

(1) When the operation detection device 110 can detect a gesture of the user, the operation detection device 110 determines that there is an operation request of the user for the slide door 40. Here, the gesture which is a detection target of the operation detection device 110 is a gesture including a motion in a direction associated with the direction of the user. For this reason, when there is a moving object moving in a direction irrelevant to the direction of the user, the operation detection device 110 does not detect the movement of the moving object as the gesture of the user. In other words, the operation detection device 110 is less likely to erroneously detect the gesture of the user even when the gesture is a simple motion. In such a manner, the operation detection device 110 can accurately detect the gesture of the user.

(2) Since the user who intends to operate the slide door 40 approaches the vehicle 10, and then performs a gesture, a moving object moving in a direction away from the vehicle 10 is highly likely to not be the user who performs a gesture. In this regard, when there is the moving object moving in the direction away from the vehicle 10, since the operation detection device 110 does not specify the moving direction of the moving object as the direction of the user, the accuracy of specifying the direction of the user can be improved. In addition, the operation detection device 110 can suppress a gesture from being detected based on a moving object which is not the user.

(3) When the user moves with respect to the vehicle 10, the pair of feet F of the user move with respect to the vehicle 10. In this regard, since the operation detection device 110 sets a direction, in which a pair of moving objects move, as the direction of the user, the operation detection device 110 can more exactly specify the direction of the user than when a direction in which a single moving object moves is specified as the direction of the user.

(4) The operation detection device 110 sets the moving direction of the user as the direction of the user, and detects a gesture including the motion of the foot F of the user in a direction associated with the direction of the user. For this reason, the operation detection device 110 can improve the accuracy of detection of the gesture.

(5) The user can cause the slide door 40 to perform the opening operation by approaching the vehicle 10 from a random direction, and then swing the right tiptoe. Namely, the user can cause the slide door 40 to perform the opening operation by performing a gesture irrelevant to the direction of the vehicle 10. Consequently, the operation detection device 110 can improve convenience of the user.

Second Embodiment

Hereinafter, a second embodiment of the operation detection device and the operation detection method will be described with reference to the drawings. The second embodiment is different from the first embodiment in that AI is used in the processes performed by the "direction specifying unit". In the following description, configurations common to those in the first embodiment will be denoted by the same reference signs, and the description thereof will be omitted.

Figure 7:
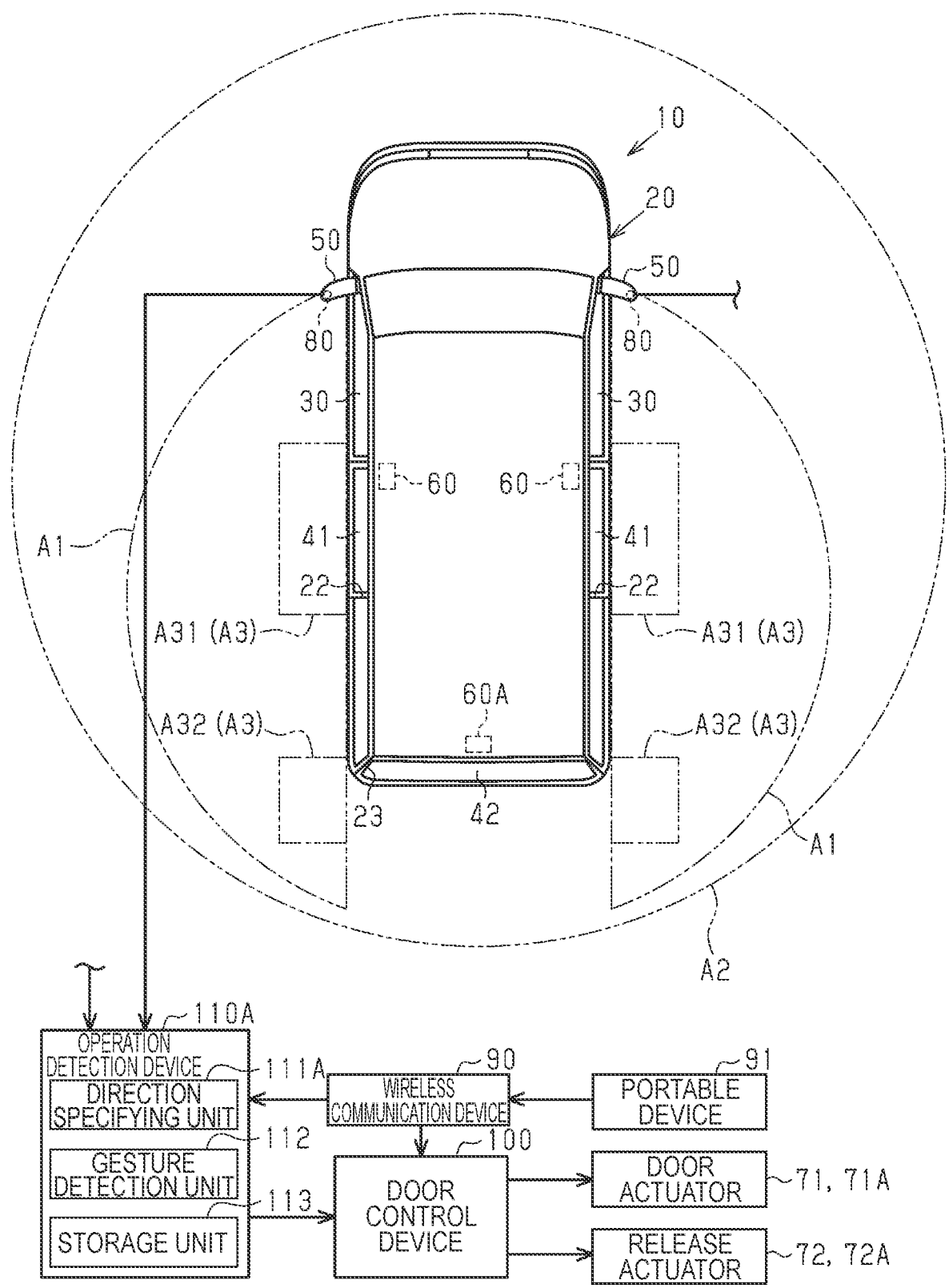
FIG. 7 is a schematic view illustrating a schematic configuration of a vehicle including a vehicle operation detection device according to a second embodiment.

As illustrated in FIG. 7, the vehicle 10 includes the vehicle body 20, the front door 30 that is swingably supported by the vehicle body 20, a slide door 41 that is slidably supported by the vehicle body 20, a back door 42 that is swingably supported by the vehicle body 20, and the side mirror 50 that is disposed in the front door 30. In addition, the vehicle 10 includes latch mechanisms 60 and 60A that restrain the slide door 41 and the back door 42 to the vehicle body 20, door actuators 71 and 71A that drive the slide door 41 and the back door 42, respectively, and release actuators 72 and 72A that drive the latch mechanisms 60 and 60A, respectively. Further, the vehicle 10 includes the camera 80 that is installed in the side mirror 50, the wireless communication device 90 that performs communication with the portable device 91, the door control device 100 that controls the door actuators 71 and 71A and the release actuators 72 and 72A, and an operation detection device 110A.

The vehicle body 20 includes a side opening portion 22 that is opened and closed by the slide door 41, and a rear opening portion 23 that is opened and closed by the back door 42. The side opening portion 22 is located in a side portion of the vehicle body 20, and the rear opening portion 23 is located in a rear portion of the vehicle body 20. In the second embodiment, the side opening portion 22 and the rear opening portion 23 correspond to one example of an "opening portion".

The latch mechanism 60A, the door actuator 71A, and the release actuator 72A have the same configurations as those of the latch mechanism 60, the door actuator 71, and the release actuator 72, except that a target is the back door 42.

The camera 80 is installed in the side portion of the vehicle body 20, specifically, in the side mirror 50. In the second embodiment, the imaging area A1 of the camera 80 is widened to the side of the vehicle 10. The imaging area A1 illustrated in FIG. 7 is an area schematically illustrated, and the host vehicle is reflected in an actual image captured by the camera 80.

Next, the operation detection device 110A will be described.

When the operation detection device 110A detects a gesture using the foot F of the user, the operation detection device 110A outputs a command signal, which corresponds to the gesture, to the door control device 100.

As illustrated in FIG. 7, the operation detection device 110A includes a direction specifying unit 111A that specifies the direction of the user with respect to the vehicle 10, the gesture detection unit 112 that detects a gesture of the user, and a storage unit 113 that stores a model which is referred to when the direction specifying unit 111A specifies the direction of the user.

In the second embodiment, the recognition area A3 in which the gesture of the user is detected includes a first recognition area A31 located beside the slide door 41, and a second recognition area A32 located behind the first recognition area A31. The first recognition area A31 is an area in which a gesture of the user for causing the slide door 41 to operate is detected, and the second recognition area A32 is an area in which a gesture of the user for causing the back door 42 to operate is detected. The second recognition area A32 is an area that is contained in the imaging area A1 of the camera 80. It is preferable that in the second recognition area A32, even when the user stands, the back door 42 during opening and closing operations does not come into contact with the user.

Subsequently, the storage unit 113 and a learned model stored in the storage unit 113 will be described.

The storage unit 113 stores a learned model that is machine learned using teacher data in which images captured in advance and the feet F of the user are associated with each other. Namely, the learned model is a model that extracts the feet F of the user from the images captured by the camera 80 in a situation where the user uses the vehicle 10. In addition, the learned model is created when the vehicle 10 is designed. Then, the learned model is written in the storage unit 113 when the vehicle 10 is produced.

Figure 8:
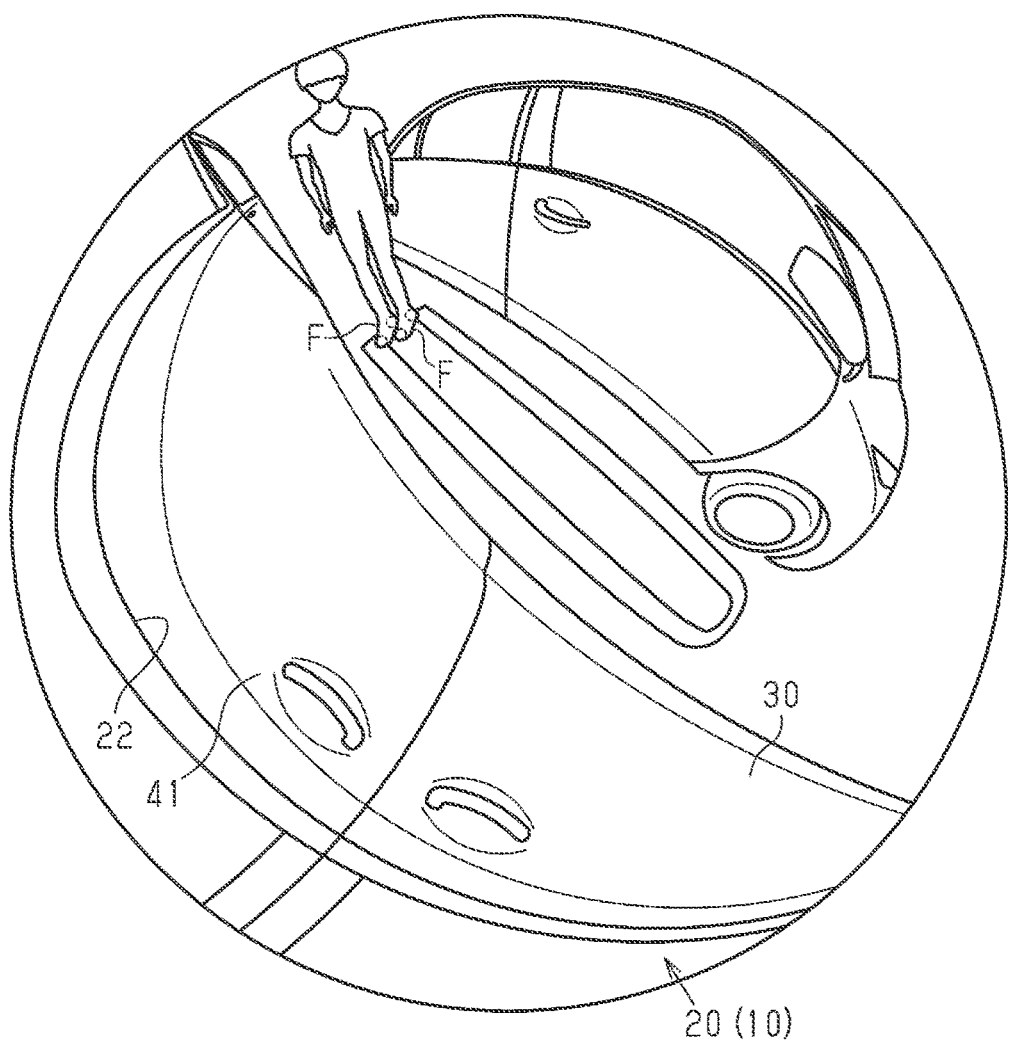
FIG. 8 is an image illustrating one example of teacher data in the second embodiment.

Hereinafter, a method for generating the learned model will be described. The method for generating the learned model includes a preparation step of preparing the teacher data as illustrated in FIG. 8, and a learning step of performing machine learning based on the teacher data.

The preparation step includes an acquisition step of acquiring images captured in a state where the user stands in the imaging area A1 under various conditions, and a designation step of designating the position of the feet F of the user in a plurality of the images captured in the acquisition step.

The acquisition step is executed using, for example, a test vehicle associated with the vehicle 10 which is an actual vehicle. It is preferable that in the acquisition step, a large number of images, which are captured while changing the condition related to the user and the condition related to an environment around the vehicle 10, are acquired. It is preferable that in the acquisition step, images when the directions of the user with respect to the vehicle 10 are different, images when the physiques of the users are different, images when the footwear and the clothes of the users are different, images when the belongings of the user are different, images when the directions of the shadow of the user are different, and the like are acquired. In addition, it is preferable that in the acquisition step, images when brightnesses around the vehicle 10 during the daytime, the nighttime, and the like are different, images when the weathers such as a sunny weather and a rainy weather are different, images when the types of the ground, on which the vehicle 10 stops, such as whether or not the ground is paved, and the like are acquired. Accordingly, the learned model which is adaptable to various situations can be acquired.

In the designation step, the positions of the right tiptoe, the left tiptoe, the right heel, and the left heel of the user, or the like in the acquired images are designated as the position of the feet F of the user. For example, coordinates using pixels in the images may be used for designating the positions. In such a manner, the teacher data as illustrated in FIG. 8 is generated.

In the learning step, the model is generated by machine learning using a plurality of the teacher data as learning data. Various techniques can be selected as a machine learning technique, and for example, a convolutional neural network (CNN) is used. The captured images are input into the learned model, so that the learned model outputs position information of the feet F of the user, specifically, position information of both tiptoes and both heels of the user. It is preferable that the learned model is verified using verification data.

Subsequently, the direction specifying unit 111A will be described.

The direction specifying unit 111A specifies the direction of the user with respect to the vehicle 10 in the recognition area A3 set in the images captured by the camera 80.

Specifically, the direction specifying unit 111A acquires the images captured at predetermined intervals when the user is present in the communication area A2. Subsequently, the images are input into the learned model stored in the storage unit 113, so that the direction specifying unit 111A acquires the position information of the feet F of the user reflected in the images. Thereafter, the direction specifying unit 111A determines whether or not the feet F of the user are present in the recognition area A3, based on the acquired position information of the feet F of the user.

When the feet F of the user are present in the first recognition area A31, the direction specifying unit 111A turns on a flag indicating that the door which the user intends to operate is the slide door 41. Meanwhile, when the feet F of the user are present in the second recognition area A32, the direction specifying unit 111A turns on a flag indicating that the door which the user intends to operate is the back door 42. Namely, the direction specifying unit 111A determines whether the door which the user wants to operate is the slide door 41 or the back door 42, based on the position where the user stands.

Incidentally, when the position information of the feet F of the user cannot be acquired, in other words, when the feet F of the user are not reflected in the images, the direction specifying unit 111A waits for acquisition of images to be captured in the next cycle. In addition, even when the feet F of the user are not present in the recognition area A3, the direction specifying unit 111A waits for acquisition of images to be captured in the next cycle.

Figure 9:
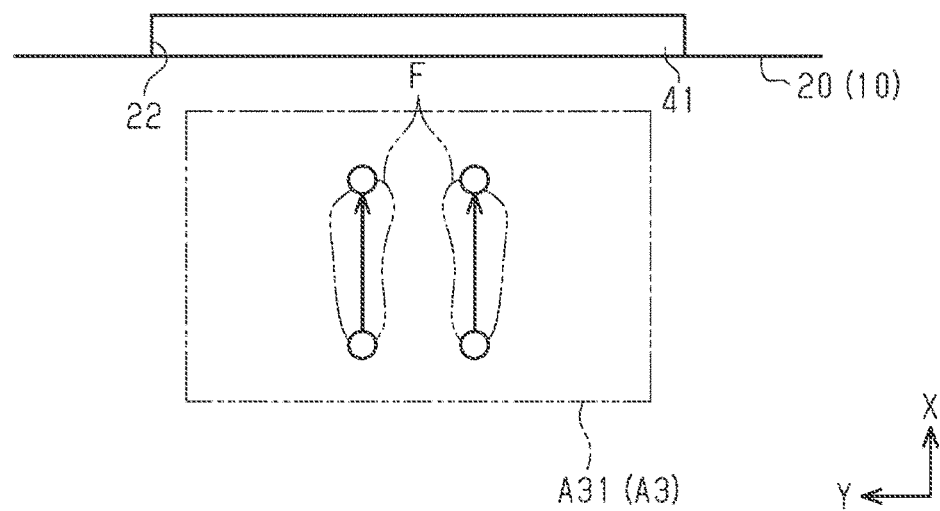
FIG. 9 is a schematic view illustrating one example of the direction of the user and a gesture of the user in the second embodiment.

When the feet F of the user are present in the recognition area A3, the direction specifying unit 111A specifies the direction of the user from the acquired position information of the feet F of the user. Specifically, as illustrated in FIG. 9, the direction specifying unit 111A calculates a vector from the right heel toward the right tiptoe and a vector from the left heel toward the left tiptoe from the acquired position information of the feet F of the user. Then, the direction specifying unit 111A sets the facing direction of both the vectors as the direction of the user. When the directions of both the vectors are different, the direction of a vector obtained by adding both the vectors may be set as the direction of the user. In such a manner, in the second embodiment, the direction specifying unit 111A specifies the direction of the user without detecting a moving object between the images captured at the predetermined intervals by the camera 80.

Next, the flow of a process that is executed by the operation detection device 110A in order to detect a gesture indicating an opening and closing operation request of the user will be described with reference to the flowchart illustrated in FIG. 10. In other words, an "operation detection method" will be described. This process is a process that is repeatedly executed in a predetermined control cycle when the vehicle 10 is stopped. Incidentally, the description of portions common to those in FIG. 6 will be omitted.

Figure 10:
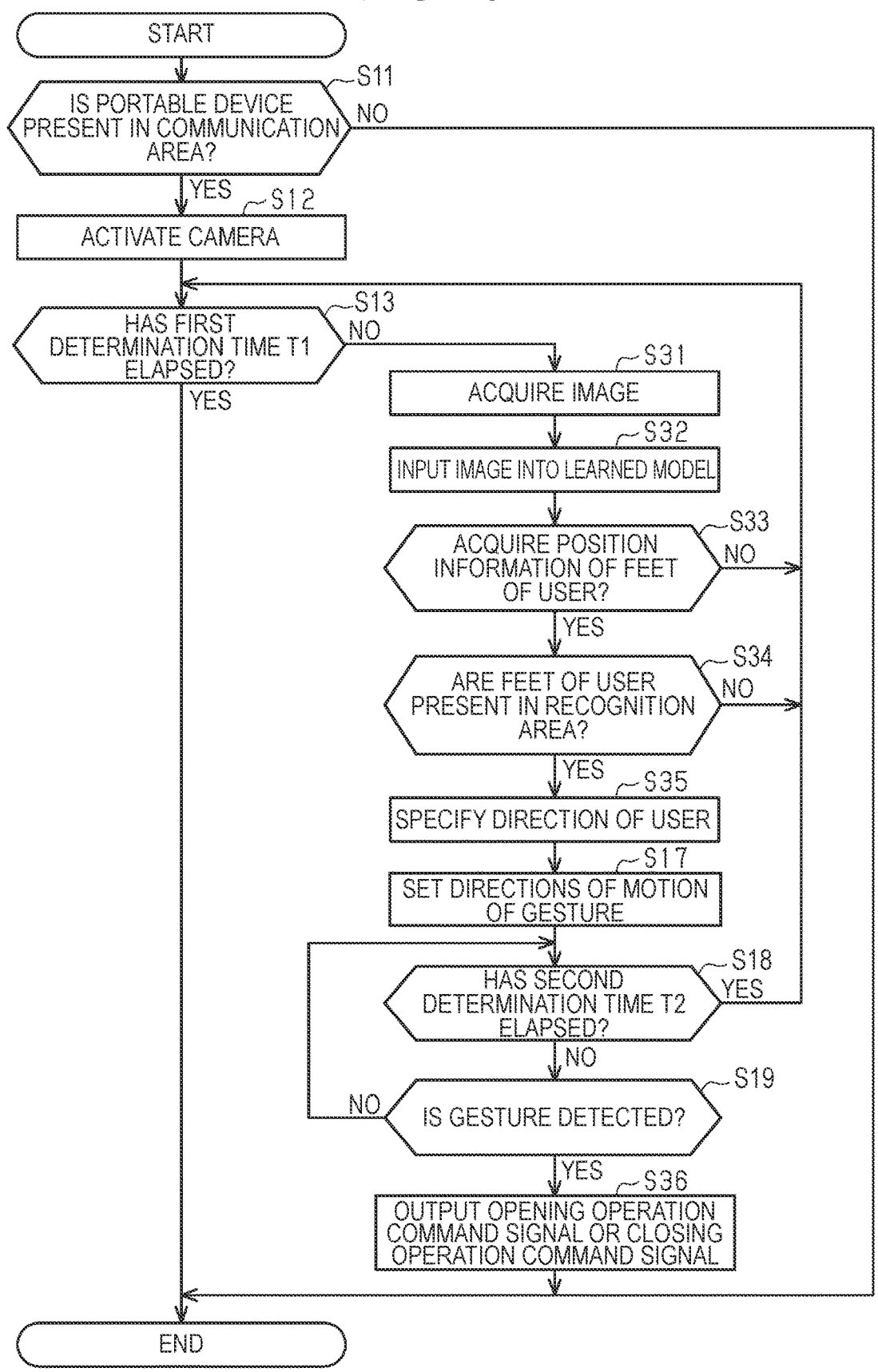
FIG. 10 is a flowchart describing the flow of a process that is executed by the vehicle operation detection device in order to detect a gesture of the user in the second embodiment.

As illustrated in FIG. 10, when the elapsed time from activation of the camera 80 is less than the first determination time T1 (S13: NO), the operation detection device 110A acquires images captured by the camera 80 (S31). Then, the operation detection device 110A inputs the images into the learned model stored in the storage unit 113 (S32). Subsequently, the operation detection device 110A determines whether or not position information of the feet F of the user can be acquired from the learned model (S33). When the position information of the feet F of the user cannot be acquired (S33: NO), for example, when the feet F of the user are not reflected in the images or when the feet F of the user are poorly reflected in the images, the operation detection device 110A executes step S13 again. On the other hand, when the position information of the feet F of the user can be acquired (S33: YES), it is determined whether or not the feet F of the user are present in the recognition area A3 (S34). When the feet F of the user are not present in the recognition area A3, the operation detection device 110A executes step S13 again. On the other hand, when the feet F of the user are present in the recognition area A3, the operation detection device 110A specifies the direction of the user based on the position information of the feet F of the user (S35). Thereafter, the operation detection device 110A sets the directions of motion of the gesture (S17).

When step S34 is executed, if the feet F of the user are present in the first recognition area A31, in step S19, the operation detection device 110A determines whether or not a gesture for causing the slide door 41 to perform the opening and closing operations is performed. For this reason, in step S36, an opening operation command signal or a closing operation command signal for causing the slide door 41 to operate is output. On the other hand, when step S34 is executed, if the feet F of the user are present in the second recognition area A32, in step S19, the operation detection device 110A determines whether or not a gesture for causing the back door 42 to perform opening and closing operations is performed. For this reason, in step S36 which is a later step, an opening operation command signal or a closing operation command signal for causing the back door 42 to operate is output.

In the flowchart illustrated in FIG. 10, steps S32 to S35 correspond to "direction specifying steps", and steps S17 to S19 correspond to "gesture detection steps".

The operation of the second embodiment will be described.

For example, a case where the user holds luggage with both hands intends to get on the vehicle 10 is assumed. In this case, the user moves to the front of the slide door 41 of the vehicle 10, and then swings the right tiptoe with respect to the left foot. Then, the slide door 41 performs the opening operation, and the user can place the luggage, which is held with both hands, in the rear seat. Here, an approaching direction of the user with respect to the vehicle 10 may be the forward and rearward direction of the vehicle 10, may be the width direction of the vehicle 10, or may be a direction intersecting both directions of the forward and rearward direction and the width direction of the vehicle 10. Namely, regardless of the approaching direction with respect to the vehicle 10, the user can cause the slide door 41 to perform the opening operation by performing a certain gesture.

The effects of the second embodiment will be described. In the second embodiment, in addition to the same effects as the effects (1) and (5) of the first embodiment, the following effects can be obtained.

(6) The operation detection device 110A specifies the direction of the user reflected in the images based on the images around the vehicle 10 and the learned model. For this reason, the operation detection device 110A does not need to specify the direction of the user based on the detection of a moving object in the images that are repeatedly captured. Therefore, the operation detection device 110A can reduce the control load required to specify the direction of the user.

(7) The operation detection device 110A can detect a gesture of the user for causing the slide door 41 to operate. In addition, the operation detection device 110A can detect a gesture of the user for causing the back door 42 to operate. Further, the operation detection device 110A can select a door to be operated according to the recognition area A3 in which the user stands.

(8) The operation detection device 110A can specify the direction of the user without detecting how the user has entered the recognition area A3. For this reason, the operation detection device 110A can specify the direction of the user even when the user gets off from the vehicle 10 through the side opening portion 22.

(9) For example, when the second recognition area A32 is set in the imaging area A1 of the camera 80 provided in the back door 42, the imaging area A1 of the camera 80 is changed as the back door 42 performs the opening and closing operations. In this regard, in the second embodiment, since the second recognition area A32 is set in the imaging area A1 of the camera 80 provided in the side mirror, the operation detection device 110A can avoid the above situation.

The above embodiments can be modified as follows to be implemented. The present embodiments and the following modification examples can be implemented in combination with each other without technical contradiction.

In the first embodiment, when a single moving object moves with respect to the vehicle 10, the direction specifying unit 111 may specify the moving direction of the single moving object as the direction of the user.

In the first embodiment, the direction specifying unit 111 may specify the moving direction of a moving object as the direction of the user only when the moving object approaches the vehicle 10 from a predetermined direction, based on images captured by the camera 80. For example, when there is a direction in which the user cannot approach the vehicle 10 in consideration of an environment in which the vehicle 10 is parked, the direction specifying unit 111 may not specify the moving direction of a moving object, which approaches from the direction, as the direction of the user.

In the first embodiment, when a moving object moving in the imaging area A1 stops in the recognition area A3 for a predetermined time, the direction specifying unit 111 may determine that the moving object is the user, and specify the moving direction of the moving object as the direction of the user. Accordingly, the accuracy of specifying the direction of the user can be improved.

In the first embodiment, when a relative positional relationship between a pair of moving objects deviates from the positional relationship corresponding to the pair of feet F of the user, the direction specifying unit 111 may determine that the moving direction of the pair of moving objects is not the direction of the user. For example, when an interval between the pair of moving objects deviates from an interval between the pair of feet F of the user, the direction specifying unit 111 may determine that the moving direction of the pair of moving objects is not the direction of the user.

In the second embodiment, the operation detection device 110A may cause machine learning to proceed as the user uses the vehicle 10. Accordingly, the model can be a model that is adapted to a usage environment of the vehicle 10 which is an actual vehicle of the user.

In the second embodiment, the teacher data may be data in which images captured in advance and the feet F of the user are associated with each other. For example, the teacher data may be data in which images and the contour of the feet F of the user are associated with each other, or may be data in which images and the direction of the feet F of the user are associated with each other. In this case, information to be output by the learned model when the images are input is changed.

In the second embodiment, when the operation detection device 110A detects a gesture of the user during operation of the slide door 41 or the back door 42, the operation detection device 110A may output a stop command signal for causing the operation of the slide door 41 or the back door 42 to stop. Hereinafter, a brief description will be given with reference to the flowchart illustrated in FIG. 11. This process is a process that is to be performed subsequent to the process illustrated in FIG. 10, and it is assumed that at the start timing of this process, the portable device 91 is present in the communication area A2, and the camera 80 has been activated.

Figure 11:
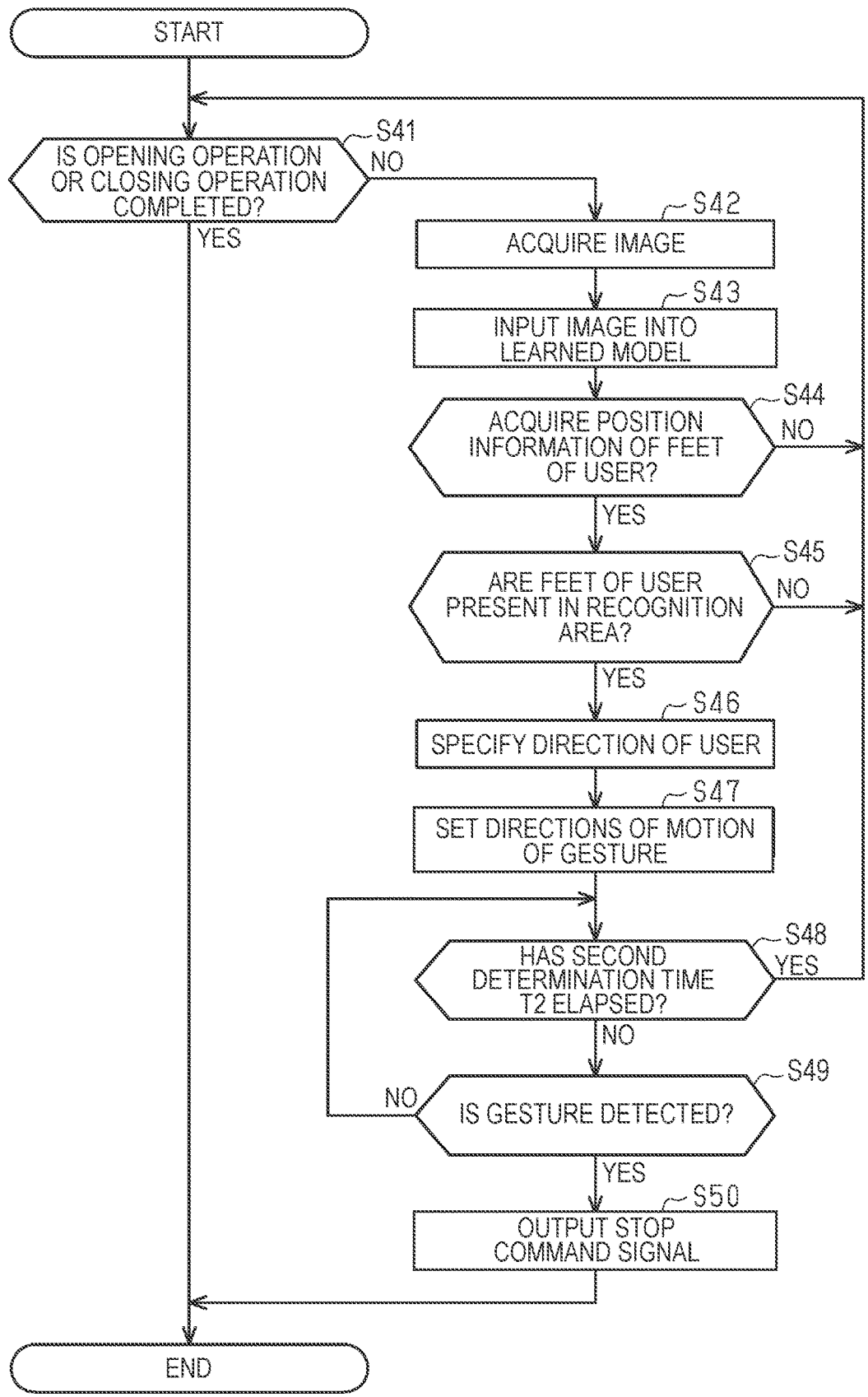
FIG. 11 is a flowchart describing the flow of a process that is executed by a vehicle operation detection device in order to detect a gesture of the user in a modification example.

As illustrated in FIG. 11, the operation detection device 110A determines whether or not the operation of the slide door 41 or the back door 42 is completed (S41). When the operation of the slide door 41 or the back door 42 is completed (S41: YES), the operation detection device 110A ends this process. On the other hand, when the operation of the slide door 41 or the back door 42 is not completed (S41: NO), the operation detection device 110A inputs the acquired images into the learned model (S42 and S43). When position information of the feet F of the user can be acquired by execution of S43 (S44: YES), and the feet F of the user is present in the recognition area A3 (S45: YES), the operation detection device 110A specifies the direction of the user based on the position information of the feet F of the user (S46).

Thereafter, the operation detection device 110A sets the directions of motion of the gesture associated with the specified direction of the user (S47). Subsequently, the operation detection device 110A determines whether or not the gesture of the user is detected within the second determination time T2 (S48 and S49). When the gesture can be detected within the second determination time T2 (S49: YES), the operation detection device 110A outputs a stop command signal to the door control device 100 (S50).

Accordingly, the user can cause the slide door 41 or the back door 42 during opening and closing operations to stop at a random position by performing the gesture using the feet F.

The gesture may not be a gesture based on the motion of the feet F of the user. For example, the gesture may be a gesture based on the motion of the arm of the user. However, it is assumed that the directions of motion of the gesture are associated with the direction of the user.

A gesture for causing the "opening and closing body" to perform the closing operation and a gesture for causing the "opening and closing body" to stop may be the same as or different from a gesture for causing the "opening and closing body" to perform the opening operation.

The gesture for causing the "opening and closing body" to perform the opening operation may be a gesture different from that in the above embodiments. For example, the gesture may be a gesture including the motion of the left foot, or may be a gesture including the motions of both feet. In addition, the gesture may include a motion of moving the right foot rightward and leftward with respect to the direction of the user, or may include a motion of moving the right foot forward and rearward.

The camera 80 may not be installed in the side mirror 50. For example, the camera 80 may be installed at an upper end of the door opening portion 21, or may be installed in the slide door 40.

The "opening and closing body" may be the front door 30 which opens and closes a door opening portion as one example of the "opening portion", may be a movable panel of a sunroof apparatus, which opens and closes a roof opening portion as one example of the "opening portion", or may be a bonnet panel which opens and closes an opening portion of an engine compartment as one example of the "opening portion".

Figure 12:
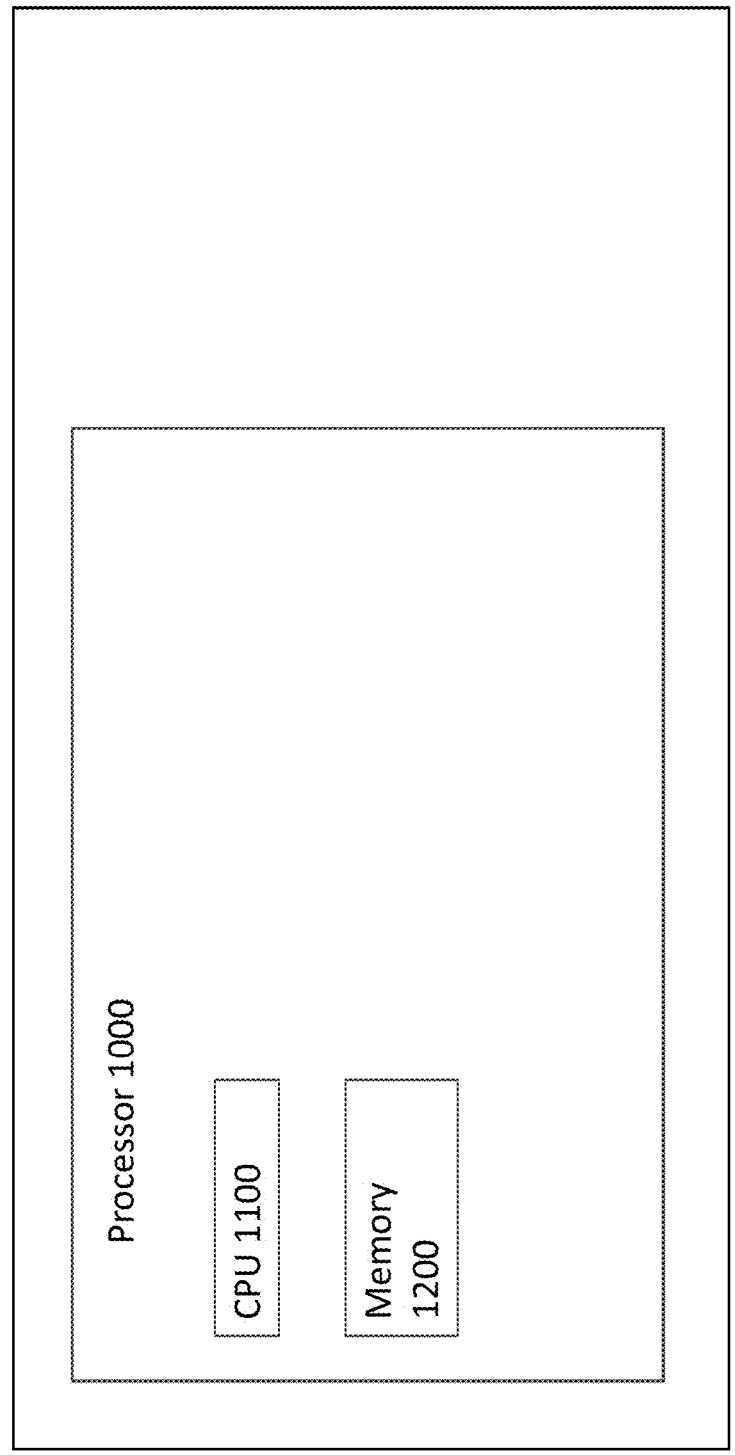
FIG. 12 is a schematic view of a processor of a vehicle operation detection device.

The door control device 100 and the operation detection devices 110 and 110A may be formed of one or more processors that operate according to a computer program (software), one or more dedicated hardware circuits such as dedicated hardware (application-specific integrated circuit: ASIC) that executes at least some processes of various processes, or a circuit including a combination thereof. As shown in FIG. 12, the processor 1000 of the operation detection devices 110 and 110A includes a CPU 1100 and memory 1200, such as a RAM and ROM, to store a program code configured to cause the CPU 1100 to execute the processes, or commands. The memory 1200, namely, a storage medium includes any available medium accessible by a general purpose or dedicated computer.

A vehicle operation detection device according to an aspect of this disclosure is applied to a vehicle including a vehicle body in which an opening portion is provided, an opening and closing body which opens and closes the opening portion, an actuator which causes the opening and closing body to perform opening and closing operations, and a camera which captures an image around the opening portion, configured to detect a gesture of a user for starting at least one of the opening operation and the closing operation of the opening and closing body. The device includes: a direction specifying unit that specifies a direction of the user with respect to the vehicle based on the image captured by the camera; and a gesture detection unit that detects the gesture including a motion in a direction associated with the direction of the user, based on the image captured by the camera, when the direction specifying unit specifies the direction of the user.

When the vehicle operation detection device can detect the gesture of the user, the vehicle operation detection device determines that there is an operation request of the user for the opening and closing body. Here, the gesture which is a detection target of the vehicle operation detection device is a gesture including the motion in the direction associated with the direction of the user. For this reason, when there is a moving object moving in a direction irrelevant to the direction of the user, the vehicle operation detection device does not detect the movement of the moving object as the gesture of the user. Namely, the vehicle operation detection device is less likely to erroneously detect the gesture of the user. In such a manner, the vehicle operation detection device can accurately detect the gesture of the user.

It is preferable that the vehicle operation detection device detects the gesture for starting the opening operation of the opening and closing body, and when there is a moving object moving in a direction away from the vehicle, the direction specifying unit does not specify a moving direction of the moving object as the direction of the user.

Since the user who intends to operate the opening and closing body approaches the vehicle, and then performs a gesture, the moving object moving in the direction away from the vehicle is highly likely to not be the user who performs a gesture. In this regard, when there is the moving object moving in the direction away from the vehicle, since the vehicle operation detection device with the above configuration does not specify the moving direction of the moving object as the direction of the user, the accuracy of specifying the direction of the user can be improved.

It is preferable that the vehicle operation detection device detects the gesture for starting the opening operation of the opening and closing body, and the direction specifying unit specifies a direction, in which a pair of moving objects move, as the direction of the user.

When the user moves with respect to the vehicle, a pair of feet of the user move with respect to the vehicle. In this regard, since the vehicle operation detection device with the above configuration sets the direction, in which the pair of moving objects move, as the direction of the user, the vehicle operation detection device can more exactly specify the direction of the user than when a direction in which a single moving object moves is specified as the direction of the user.

It is preferable that in the vehicle operation detection device, the gesture which is a detection target of the gesture detection unit includes a motion of a foot of the user.

The vehicle operation detection device with the above configuration sets the moving direction of the pair of feet of the user as the direction of the user, and detects the gesture including the motion of the foot of the user in the direction associated with the direction of the user. For this reason, the vehicle operation detection device can improve the accuracy of detection of the gesture.

It is preferable that the vehicle operation detection device further includes a storage unit that stores a learned model which is machine learned using teacher data in which the image captured in advance and a foot of the user are associated with each other, and the direction specifying unit specifies the direction of the user based on the foot of the user which is estimated based on the image newly captured and the learned model.

The vehicle operation detection device with the above configuration specifies the direction of the user based on the image around the opening portion and the learned model. For this reason, the vehicle operation detection device does not need to specify the direction of the user based on the detection of a moving object in the images that are repeatedly captured. Therefore, the vehicle operation detection device can reduce the control load required to specify the direction of the user.

It is preferable that in the vehicle operation detection device, the camera is disposed in a side portion of the vehicle body, the opening portion includes a side opening portion located in the side portion of the vehicle body, and the opening and closing body includes a slide door that opens and closes the side opening portion.

The vehicle operation detection device with the above configuration can detect a gesture of the user for causing the slide door to operate.

It is preferable that in the vehicle operation detection device, the camera is disposed in a side portion of the vehicle body, the opening portion includes a rear opening portion located in a rear portion of the vehicle body, and the opening and closing body includes a back door that opens and closes the rear opening portion.

The vehicle operation detection device with the above configuration can detect a gesture of the user for causing the back door to operate.

A vehicle operation detection method solving the above problem disclosure is applied to a vehicle including a vehicle body in which an opening portion is provided, an opening and closing body which opens and closes the opening portion, an actuator which causes the opening and closing body to perform opening and closing operations, and a camera which captures an image around the opening portion, to detect a gesture of a user for starting at least one of the opening operation and the closing operation of the opening and closing body. The method includes: a direction specifying step of specifying a direction of the user with respect to the vehicle based on the image captured by the camera; and a gesture detection step of detecting the gesture including a motion in a direction associated with the direction of the user, based on the image captured by the camera, when the direction of the user is specified in the direction specifying step.

According to the vehicle operation detection method, the same effects of the vehicle operation detection device described above can be obtained.

The vehicle operation detection device and the vehicle operation detection method can accurately detect the gesture of the user.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle operation detection device that is applied to a vehicle including a vehicle body provided with an opening portion, an opening and closing body configured to open and close the opening portion, an actuator configured to cause the opening and closing body to perform opening and closing operations, and a camera configured to capture an image around the opening portion, and is configured to detect a gesture of a user for starting at least one of the opening operation and the closing operation of the opening and closing body, the vehicle operation detection device comprising:
a processor configured to
acquire a moving direction of a pair of moving objects of the user with respect to the vehicle based on the image captured by the camera;
determine whether or not the moving direction of the pair of moving objects of the user is a direction approaching the vehicle;
when the moving direction of the pair of moving objects of the user is the direction approaching the vehicle, specify the moving direction of the pair of moving objects of the user as a direction of the user;
set directions of motion of the gesture in association with the specified direction of the user; and
determine that the gesture has been detected, based on the image captured by the camera, when the directions of motion of at least one of the pair of moving objects of the user are changed in order of the set directions of motion of the gesture.

2. The vehicle operation detection device according to claim 1, wherein
the vehicle operation detection device detects the gesture for starting the opening operation of the opening and closing body, and
when the moving direction of the pair of moving objects is not the direction approaching the vehicle, the processor is configured to not specify the moving direction of the pair of moving objects as the direction of the user.

3. The vehicle operation detection device according to claim 1, wherein
the vehicle operation detection device detects the gesture for starting the opening operation of the opening and closing body.

4. The vehicle operation detection device according to claim 3, wherein
the gesture includes a motion of a foot of the user.

5. The vehicle operation detection device according to claim 1, further comprising:
a storage unit that stores a learned model which is machine learned using teacher data in which the image captured in advance and a foot of the user are associated with each other, wherein
the processor is configured to specify the moving direction of the pair of moving objects of the user as the direction of the user based on the foot of the user, the moving direction being estimated based on the image newly captured and the learned model.

6. The vehicle operation detection device according to claim 1, wherein
the camera is disposed in a side portion of the vehicle body,
the opening portion includes a side opening portion located in the side portion of the vehicle body, and
the opening and closing body includes a slide door that opens and closes the side opening portion.

7. The vehicle operation detection device according to claim 1, wherein
the camera is disposed in a side portion of the vehicle body,
the opening portion includes a rear opening portion located in a rear portion of the vehicle body, and
the opening and closing body includes a back door that opens and closes the rear opening portion.

8. A vehicle operation detection method that is applied to a vehicle including a vehicle body provided with an opening portion, an opening and closing body configured to open and close the opening portion, an actuator configured to cause the opening and closing body to perform opening and closing operations, and a camera configured to capture an image around the opening portion, to detect a gesture of a user for starting at least one of the opening operation and the closing operation of the opening and closing body, the method comprising:
acquiring a moving direction of a pair of moving objects of the user with respect to the vehicle based on the image captured by the camera;

determining whether or not the moving direction of the pair of moving objects of the user is a direction approaching the vehicle;

when the moving direction of the pair of moving objects of the user is the direction approaching the vehicle, specifying the moving direction of the pair of moving objects of the user as a direction of the user;

setting directions of motion of the gesture in association with the specified direction of the user; and determining that the gesture has been detected, based on the image captured by the camera, when the directions of motion of at least one of the pair of moving objects of the user are changed in order of the set directions of motion of the gesture.

* * * * *